(12) United States Patent
Mann et al.

(10) Patent No.: US 8,721,754 B2
(45) Date of Patent: May 13, 2014

(54) FILTER CLAMPING SYSTEM

(75) Inventors: Richard Michael Ashley Mann, Basingstoke (GB); Abhijeet Madhukar Kulkarni, Basingstoke (GB); Peter Thomas McGuigan, Selborne Alton (GB)

(73) Assignee: BHA Altair, LLC, Franklin, TN (US)

( * ) Notice: Subject to any disclaimer, the term of this patent is extended or adjusted under 35 U.S.C. 154(b) by 163 days.

(21) Appl. No.: 13/280,484

(22) Filed: Oct. 25, 2011

(65) Prior Publication Data

US 2013/0097979 A1    Apr. 25, 2013

(51) Int. Cl.
*B01D 45/00*    (2006.01)

(52) U.S. Cl.
USPC ............... 55/480; 55/481; 55/493; 55/497; 55/500; 55/510

(58) Field of Classification Search
USPC ........... 55/357, 480–481, 493, 497, 499–505, 55/508, 510–511, 516–517, DIG. 31; 160/378; 454/146
See application file for complete search history.

(56) References Cited

U.S. PATENT DOCUMENTS

| | | | | |
|---|---|---|---|---|
| 5,254,033 A | * | 10/1993 | Brauen et al. | 454/146 |
| 5,464,461 A | * | 11/1995 | Whitson et al. | 55/480 |
| 2003/0074872 A1 | | 4/2003 | Lawlor, Sr. | |
| 2009/0284444 A1 | * | 11/2009 | Wilson et al. | 345/32 |

* cited by examiner

*Primary Examiner* — Jason M Greene
*Assistant Examiner* — Karla Hawkins
(74) *Attorney, Agent, or Firm* — Reinhart Boerner Van Deuren P.C.

(57) ABSTRACT

A spring loaded filter clamping frame includes a rear frame section which defines an interior space to secure a filter element. The rear frame section includes a projection extending toward the interior space and a rear latch mechanism. A front frame section defines an interior space and is slidably engaged with the rear frame section. An aperture in the front frame section interacts with the projection. A front latch mechanism with a latch mechanism biasing member interacts with the rear latch mechanism. A frame biasing member is located between the rear frame section and the front frame section. The frame biasing member applies a force urging the rear frame section and the front frame section apart, resulting in a filter clamping frame. In further examples, the frame biasing member is a coil spring and the latch mechanisms are hooks.

17 Claims, 5 Drawing Sheets

FILTER CLAMPING SYSTEM

BACKGROUND OF THE INVENTION

1. Field of the Invention

The subject matter disclosed herein relates to a filtration apparatus, and more particularly, to a filtration apparatus that holds a filter element.

2. Discussion of Prior Art

Filter elements can be used to provide clean fluid, such as air, to or from various devices. Such devices can include gas turbines where clean air over a long service life of the gas turbine is important. Filter elements used within gas turbines can include prefilters and final filters. Filter elements can be held in place in a filter frame within an inlet housing.

However, new, more efficient filter elements have differing overall dimensions such as reduced thickness measured from an upstream side to a downstream side of the filter element. This reduced thickness can provide installation difficulties or prevent installation of more efficient filter elements altogether. These difficulties discourage possible retrofits of existing filtration equipment with more efficient filter elements. Furthermore, the installation difficulties can result in reduced efficiency of the filtration apparatus when retrofitted with new filter element designs or cause damage to the filter elements. Filter elements with reduced thickness can also yield a poor fit for the filter element within the filter frame, allowing movement of the filter element in the direction of the fluid flow. This freedom of movement can deter a proper seal for the filter element with the filter frame, in turn creating possible paths for the fluid to flow around filter element rather than through a filter media within the filter element. As a result, there are benefits for continual improvements in filter technologies so as to address these and other issues.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a spring loaded filter clamping frame that includes a rear frame section defining an interior space. The rear frame section secures a filter element. The rear frame section includes a projection attached to the rear frame section extending toward the interior space. The rear frame section further includes a rear latch mechanism. The filter clamping frame also includes a front frame section defining an interior space. The front frame section is slidably engageable with the rear frame section and the front frame section secures the filter element. The front frame section includes an aperture to interact with the projection. The front frame section further includes a front latch mechanism to interact with the rear latch mechanism. The filter clamping frame also includes a frame biasing member located between the rear frame section and the front frame section. The frame biasing member applies a force urging the rear frame section and the front frame section apart, resulting in a spring loaded filter clamping frame.

In accordance with another aspect, the present invention provides a filter including a rear frame section defining an interior space. The rear frame section secures a filter element. The rear frame section includes a projection attached to the rear frame section extending toward the interior space. The rear frame section further includes a rear latch mechanism. The filter element includes filter media. The filter clamping frame also includes a front frame section defining an interior space. The front frame section is slidably engageable with the rear frame section and the front frame section secures the filter element. The front frame section includes an aperture to interact with the projection. The front frame section further includes a front latch mechanism to interact with the rear latch mechanism. The filter clamping frame also includes a frame biasing member located between the rear frame section and the front frame section. The frame biasing member applies a force urging the rear frame section and the front frame section apart, resulting in a spring loaded filter clamping frame.

In accordance with another aspect, the present invention provides a filtration media apparatus inlet for a gas turbine. The filtration media apparatus inlet includes a rear frame section defining an interior space. The rear frame section secures a filter element. The rear frame section includes a projection attached to the rear frame section extending toward the interior space. The rear frame section further includes a rear latch mechanism. The filtration media apparatus inlet further includes a front frame section defining an interior space. The front frame section is slidably engageable with the rear frame section and the front frame section secures the filter element. The front frame section includes an aperture to interact with the projection. The front frame section further includes a front latch mechanism to interact with the rear latch mechanism. The filtration media apparatus inlet also includes a frame biasing member located between the rear frame section and the front frame section. The frame biasing member applies a force urging the rear frame section and the front frame section apart, resulting in a spring loaded filter clamping frame.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
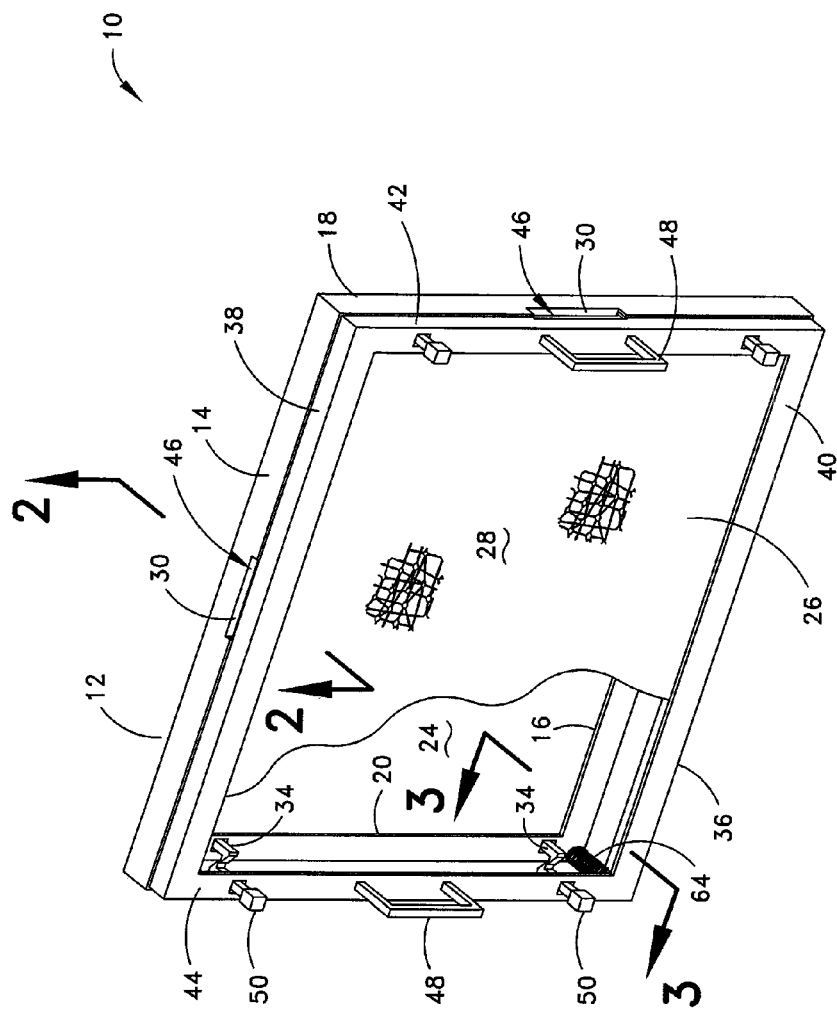
FIG. 1 is a perspective view of a first example spring loaded filter clamping frame.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Examples of a spring loaded filter clamping frame in accordance with one or more aspects of the present invention are described in detail below. In general, the described spring loaded filter clamping frame is a modular unit to be inserted and removed from existing filtration equipment. In another example, a filter includes a spring loaded filter clamping frame. In yet another example, a filtration apparatus, such as a gas turbine, includes an inlet incorporating a spring loaded filter clamping frame.

The spring loaded filter clamping frame is designed to hold a filter element within the frame and also limit the movement of a final filter when the spring loaded filter clamping frame is located between the final filter and a fixed object, such as a holding frame. The spring loaded filter clamping frame includes a rear frame section and a front frame section wherein the outside dimensions of the front frame section are slightly smaller than the inside dimensions of the rear frame section. This enables the front frame section to slidably engage the rear frame section. The front frame section and rear frame section are urged apart by at least one biasing member, giving the spring loaded filter clamping frame a variable depth dimension. This variable depth dimension is a distance measured from the upstream side of the front frame section to the downstream side of the rear frame section. There is a continuum of depth dimensions that can be realized as a result of the biasing member urging the front frame section away from the rear frame section or force applied by a human operator to urge the front frame section toward the rear frame section. Undesired movement of the final filter within the filter frame is limited by a force applied to the final filter by the spring loaded filter clamping frame, wherein the applied force results from the biasing member. The spring loaded filter clamping frame also promotes a filter gasket seal for the final filter by applying a force to the final filter, compressing any gasket material associated with the final filter, and helping ensure fluid flow passes through the filter media and not around the filter media. Additional components limit the distance through which the front frame section and rear frame section are separated by the biasing member.

Figure 2:
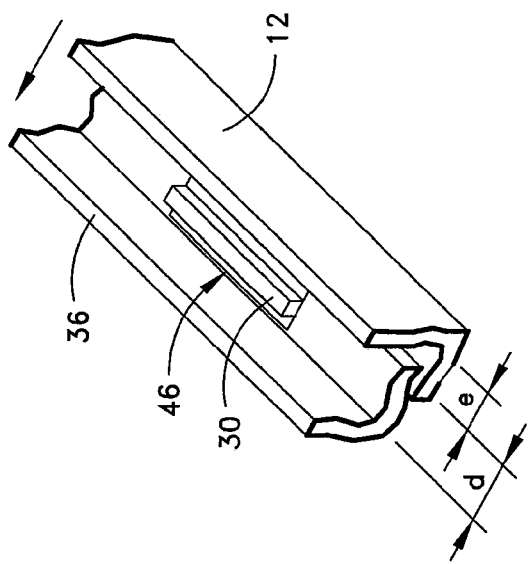
FIG. 2 is a perspective view generally along line 2-2 of FIG. 1 of a projection and an aperture of the spring loaded filter clamping frame of FIG. 1.

An example spring loaded filter clamping frame is generally designated 10 within FIG. 1. It is to be appreciated that FIG. 1 merely shows one example and that other examples are contemplated within the present invention. As the spring loaded filter clamping frame 10 is intended for use in existing filtration equipment such as a gas turbine inlet installation. The shape of the spring loaded filter clamping frame 10 will typically be in a rectangular or square shape, although other shapes are contemplated. The spring loaded filter clamping frame 10 includes a rear frame section 12. In the shown example, the rear frame section 12 includes a top rear portion 14, bottom rear portion 16, right rear portion 18, and left rear portion 20. Each of the top rear portion 14, bottom rear portion 16, right rear portion 18, and left rear portion 20 may have a cross sectional shape of an "L" (for example, see reference numeral 12 in FIG. 2), although variations can be made in the cross sectional shape. The frame portions may be constructed of metal, plastic, wood, or other materials. The use of readily available formed shapes, such as extruded metal angles, promotes ease of construction and less expensive material cost.

The rear frame section 12 (FIG. 1) bounds an interior space 24. The rear frame section 12 secures a filter element 26. The interior space 24 is an open area through which a fluid flow may pass. The filter element 26 can be a prefilter and it is configured for filtering a fluid, such as air proceeding to a turbine, such as a gas turbine. The filter element 26 can be a high efficiency filter. The filter element 26 includes filter media 28. The filter media 28 is configured to collect particulate material including but not limited to dust. The filter media 28 can be formed from a variety of materials, can be formed to have a variety of structures such as fibers, and can be formed by a variety of processes. The filter media 28 can include various types of media including but not limited to media that has been pleated and/or corrugated. One or more aspects of the filter media 28, such as material, construction, configuration, thickness, etc. can be varied.

A projection 30 attached to the rear frame section 12 extends toward the interior space 24. A detail of the projection 30 can be seen in FIG. 2. The projection 30 can be formed in the shape of a lip, although other geometries are contemplated. The projection 30 can be created by selectively bending a portion of the rear frame section 12 toward the interior space 24 (best seen in FIG. 1).

Figure 3:
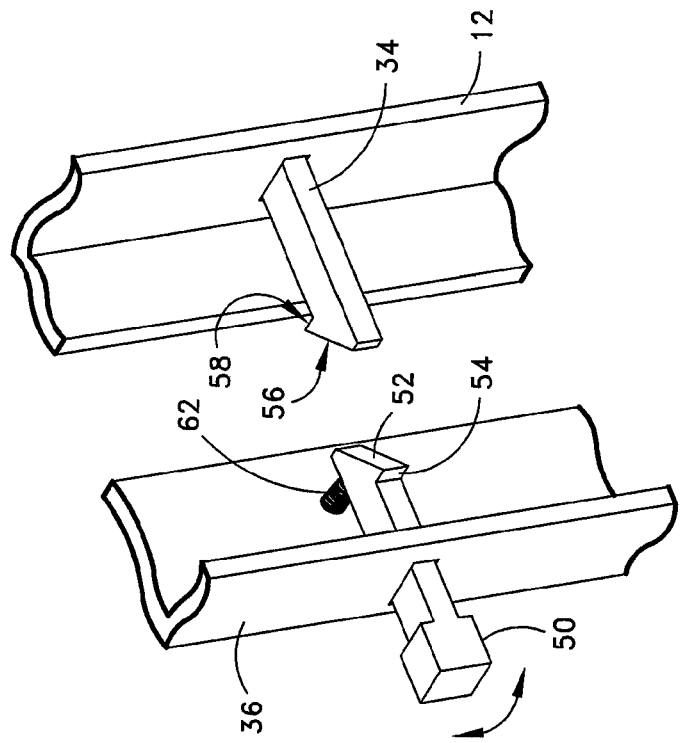
FIG. 3 is a perspective view generally along line 3-3 of FIG. 1 of a rear latch mechanism and a front latch mechanism of the spring loaded filter clamping frame of FIG. 1.

Turning to FIG. 3, the rear frame section 12 further includes at least one rear latch mechanism 34 attached to the rear frame section 12. The shown example has four latch mechanisms 34 (only two are visible). The attachment can be rigid, or alternatively, can be an attachment that allows the rear latch mechanism 34 to pivot or translate linearly. The rear latch mechanism 34 is shown as a hook, although other variations of a rear latch mechanism 34 are contemplated.

Returning to FIG. 1, the spring loaded filter clamping frame 10 includes a front frame section 36. In a rectangular or square spring loaded filter clamping frame 10, the front frame section 36 includes a top front portion 38, bottom front portion 40, right front portion 42, and left front portion 44. Each of the top front portion 38, bottom front portion 40, right front portion 42, and left front portion 44 may have a cross sectional shape of an "L" (for example, see reference numeral 36 in FIG. 2) although variations can be made in the cross sectional shape. Similar to the rear frame section 12, the front frame section 36 bounds the interior space 24. The front frame section 36 secures the filter element 26. The interior space 24 permits a fluid flow through the front frame section 36.

The shape of the front frame section 36 is complementary to the dimensions of the rear frame section 12. However, the exterior dimensions of the front frame section 36 are substantially similar to but smaller than the interior dimensions of the rear frame section 12. As such, the front frame section 36 is slidably engageable with the rear frame section 12. When slidably engageable with each other, the rear frame section 12 and the front frame section 36 overlap their respective L-shaped cross section portions to form a "U"-shaped cross section.

The front frame section 36 defines at least one aperture 46 within one of the top front portion 38, the bottom front portion 40, the right front portion 42, and the left front portion 44. Turning again to FIG. 2, the aperture 46 defined by the front frame section 36 interacts with the projection 30 so that the projection 30 extends into the aperture 46. This interaction helps prevent the front frame section 36 from completely disengaging from the rear frame section 12, providing limited telescoping action to allow the front frame section 36 to slide outward relative to the rear frame section 12 (as indicated by the motion arrow in FIG. 2). At one position, the projection 30 contacts an aperture 46 boundary thereby stopping the outward travel of the front frame section 36 and maintaining engagement between the front frame section 36 and the rear frame section 12. The aperture 46 can be used to physically limit the telescoping action for the front frame section 36. For example, an aperture 46 having a shorter throat dimension d results in less distance that the front frame section 36 is capable of traveling while in engagement with the rear frame section. The location of the aperture 46 may also be varied to physically limit the start and end points of the front frame section's 36 allowable travel. For example, if the throat dimension d is separated by a dimension e from the rear frame section 12, variations in dimension e result in a change of where the allowable travel distance of the front frame section 36 starts and ends. The example of FIG. 1 shows four apertures 46, one on each of the top front portion 38, bottom front portion 40, right front portion 42 and left front portion 44, however, varying locations and numbers of apertures 46 are contemplated.

Additionally, the front frame section 36 can include at least one handle 48 to aid in the insertion and removal of the spring loaded filter clamping frame 10 into and out of filtration equipment. The front frame section 36 also includes a front latch mechanism 50 to interact with the rear latch mechanism 34. The front latch mechanism 50 can be best seen in FIG. 3. The front latch mechanism 50 is pivotably connected to the front frame section 36, although alternate connection methods are also contemplated. The front latch mechanism 50 is shown as a hook, but other front latch mechanism designs are contemplated. The front latch mechanism 50 includes a first angled surface 52 and a first engaging surface 54. The rear latch mechanism 34 includes a second angled surface 56 and a second engaging surface 58.

When a force urges the front frame section 36 to travel into the rear frame section 12, the first angled surface 52 makes contact with the second angled surface 56. The angled surfaces of the front latch mechanism 50 and the rear latch mechanism 34 create an angular component of the force, acting perpendicular to the first angled surface 52. This angular component of the force urges the front latch mechanism 50 to rotate about its rotatable connection to the front frame section 36. The front latch mechanism 50 then rotates out of its neutral position, and the force continues to move the front frame section 36 into the rear frame section 12, sliding the first angled surface 52 along the second angled surface 56. After the first angled surface 52 and the second angled surface 56 have slid past each other, the front latch mechanism 50 is free to rotate back to its neutral position. When the front latch mechanism 50 rotates back to its neutral position, the first engaging surface 54 of the front latch mechanism 50 mates with the second engaging surface 58 of the rear latch mechanism 34.

When the first engaging surface 54 of the front latch mechanism 50 mates with the second engaging surface 58 of the rear latch mechanism 34, the front frame section 36 cannot be pulled out from the rear frame section 12. Thus, when the front frame section 36 is pushed into the rear frame section 12 to a certain distance, the front latch mechanism 50 and the rear latch mechanism 34 will hook onto each other and act in concert to hold the rear and front frame sections 12, 36 in a collapsed state until the front latch mechanism 50 is released.

The front latch mechanism 50 can be placed through an opening in the front frame section 36. The end of the front latch mechanism 50 extending through the front frame section 36 can include a knob or other enlarged structure to facilitate manual operation of the front latch mechanism 50.

When an operator desires to pull the front frame section 36 out of the rear frame section 12 from the collapsed state to an extended state, the operator can manually move the knob to rotate the front latch mechanism 50. This rotation takes the front latch mechanism 50 out of the mating arrangement with the rear latch mechanism 34, and the front frame section 36 can then be moved away from the rear frame section 12. The example of FIG. 1 shows four front latch mechanisms 50, two attached to the right front portion 42 and two attached to the left front portion 44, however, varying locations and numbers of front latch mechanisms 50 are contemplated.

Returning to FIG. 3, the front frame section 36 further includes a latch mechanism biasing member 62 located between the front frame section 36 and the front latch mechanism 50. The latch mechanism biasing member 62 can be a coil spring or any other biasing member as is known in the art. The latch mechanism biasing member 62 urges the front latch mechanism 50 into its neutral position. The latch mechanism biasing member 62 also moves the front latch mechanism 50 into the mating position with the rear latch mechanism 34 after the front frame section 36 has been moved a certain distance into the rear frame section 12 and the first angled surface 52 has slid past the second angled surface 56 as described above.

Returning to FIG. 1, the spring loaded filter clamping frame 10 also includes a frame biasing member 64 located between the rear frame section 12 and the front frame section 36. The frame biasing member 64 may be a coil spring or any other biasing member as is known in the art. The frame biasing member 64 applies a force urging the rear frame section 12 and the front frame section 36 away from each other. The frame biasing member 64 can be limited by both the projection 30 acting with the aperture 46 of the front frame section 36 and the front latch mechanism 50 acting with the rear latch mechanism 34. FIG. 1 shows a coil spring as one example of a frame biasing member 64 in one corner of the spring loaded filter clamping frame 10. The example spring loaded filter clamping frame 10 includes a coil spring in each of the four corners (only one is visible in FIG. 1). However, varying locations and numbers of frame biasing members 64 are contemplated.

Figure 4:
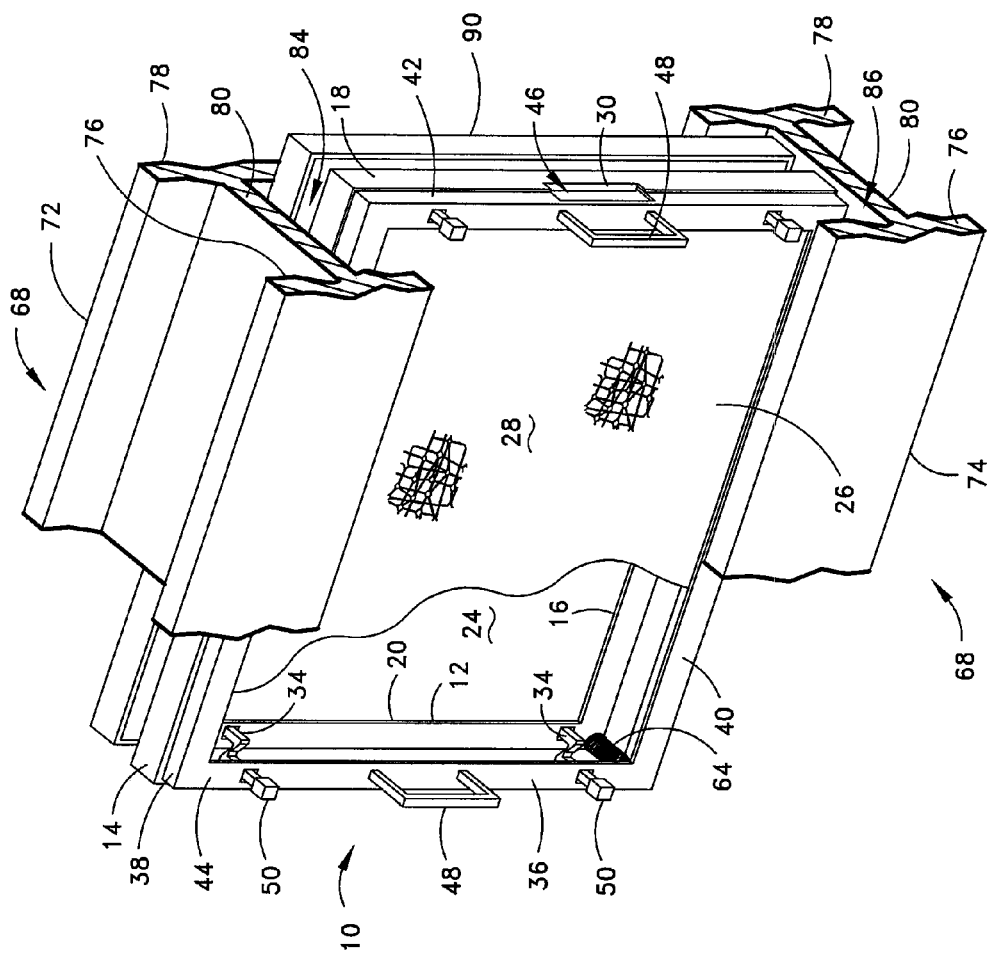
FIG. 4 is a perspective view of the spring loaded filter clamping frame of FIG. 1 in a collapsed state, placed in an up and under filter holding frame inside example filtration equipment.

Turning to FIG. 4, many examples of filtration equipment include structure designed to retain one or more filter elements 26 to remove particulate matter from a fluid flow prior to fluid flow utilization in a downstream operation, such as the filtration equipment incorporated into a gas turbine inlet system. One example of structure designed to retain one or more filter elements 26 is an up and under filter holding frame 68. The up and under filter holding frame 68 can also be known by other names, such as a "lift and drop" filter holding frame. For convenience, this application will use the name "up and under filter holding frame." The up and under filter holding frame 68 can include a top section 72 and a bottom section 74. The top section 72 can include an upstream member 76, a downstream member 78, and a connecting member 80. The upstream member 76, downstream member 78, and connecting member 80 bound a top section space 84. Much like the top section 72, the bottom section 74 can include an upstream member 76, a downstream member 78, and a connecting member 80 that can bound a bottom section space 86. The top section 72 and bottom section 74 can be constructed of structural channel, I-beam, or other similarly shaped materials.

FIG. 4 shows a final filter 90 located in the up and under filter holding frame 68. The final filter 90 is typically inserted into the up and under filter holding frame 68 by holding the final filter 90 generally upright with the final filter 90 bottom side slightly upstream of the final filter 90 top side. The final filter 90 top side is then inserted into the top section space 84. The top section 72 is spaced from the bottom section 74 so that the final filter 90 can then be rotated about its top side to move the final filter 90 bottom side to a position above the bottom section space 86. The final filter 90 is then moved downward into the bottom section space 86 where the final filter 90 remains during operation of the filtration equipment.

The example of FIG. 4 also shows a spring loaded filter clamping frame 10 placed in the up and under filter holding frame 68 upstream of the final filter 90. The spring loaded filter clamping frame 10 contains a filter element 26. Prior to insertion into the filtration equipment, the front frame section 36 is pushed into the rear frame section 12, compacting the coil springs. When the front frame section 36 has reached a certain position relative to the rear frame section 12, the front latch mechanisms 50 engage the rear latch mechanisms 34 to hold the spring loaded filter clamping frame 10 in its contracted state, as shown in FIG. 4.

The spring loaded filter clamping frame 10 can be inserted into the filtration equipment between a final filter 90 and the upstream member 76 of the bottom section 74 of the up and under filter holding frame 68. The process for inserting the spring loaded filter clamping frame 10 is similar to the insertion process for the final filter 90. The spring loaded filter clamping frame 10 is held generally vertically with the bottom front portion 40 slightly upstream of the top front portion 38. The top front portion 38 is then inserted into the top section space 84. The top section 72 is spaced from the bottom section 74 so that the spring loaded filter clamping frame 10 can then be rotated about its top front portion 38 to move the spring loaded filter clamping frame 10 bottom front portion 40 to a position above the bottom section space 86. The spring loaded filter clamping frame 10 is then moved downward into the bottom section space 86 where the spring loaded filter clamping frame 10 remains during operation of the filtration equipment.

Figure 5:
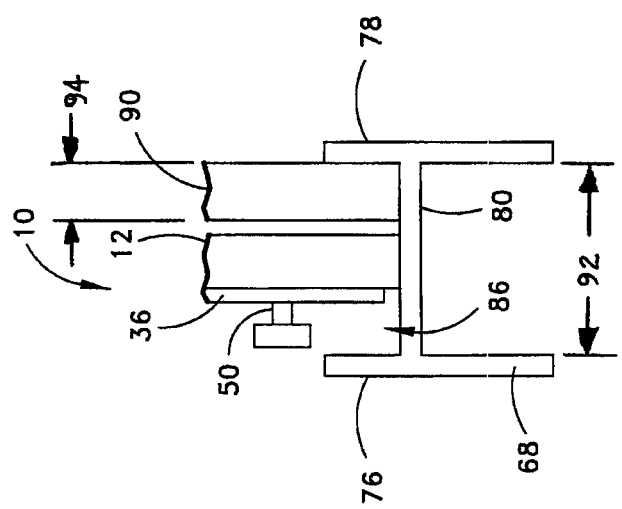
FIG. 5 is a side view of a portion of the spring loaded filter clamping frame of FIG. 1 in a collapsed state, placed in an up and under filter holding frame inside example filtration equipment.

Turning to FIG. 5, the bottom section space 86 of an example up and under filter holding frame 68 has a depth dimension 92 measured from the upstream member 76 to the downstream member 78. This depth dimension 92 of an example bottom section space 86 is larger than the sum of the depth dimension 94 of the final filter 90 and the depth dimension of the filter element 26 (the filter element 26 is best seen in FIG. 4). When the filter clamping frame 10 telescoping feature is not utilized, a gap may exist between the rear frame section 12 and the final filter 90, and the final filter 90 and the filter element 26 are not held firmly in place with forces acting in the upstream and downstream directions. As a result, any gasket material associated with the final filter 90 lacks adequate downstream force to compress the gasket and reduce potential fluid flow around the filter element 26. Additionally, the final filter 90 may move during operation of the filtration equipment when the filter clamping frame 10 telescoping feature is not utilized due to the lack of physical constraint acting on the final filter 90. It is more desirable to hold the final filter 90 in its intended position because an undesired final filter 90 position can allow particulate matter to pass around the final filter 90 that can cause damage or premature wear to downstream mechanical equipment.

Figure 6:
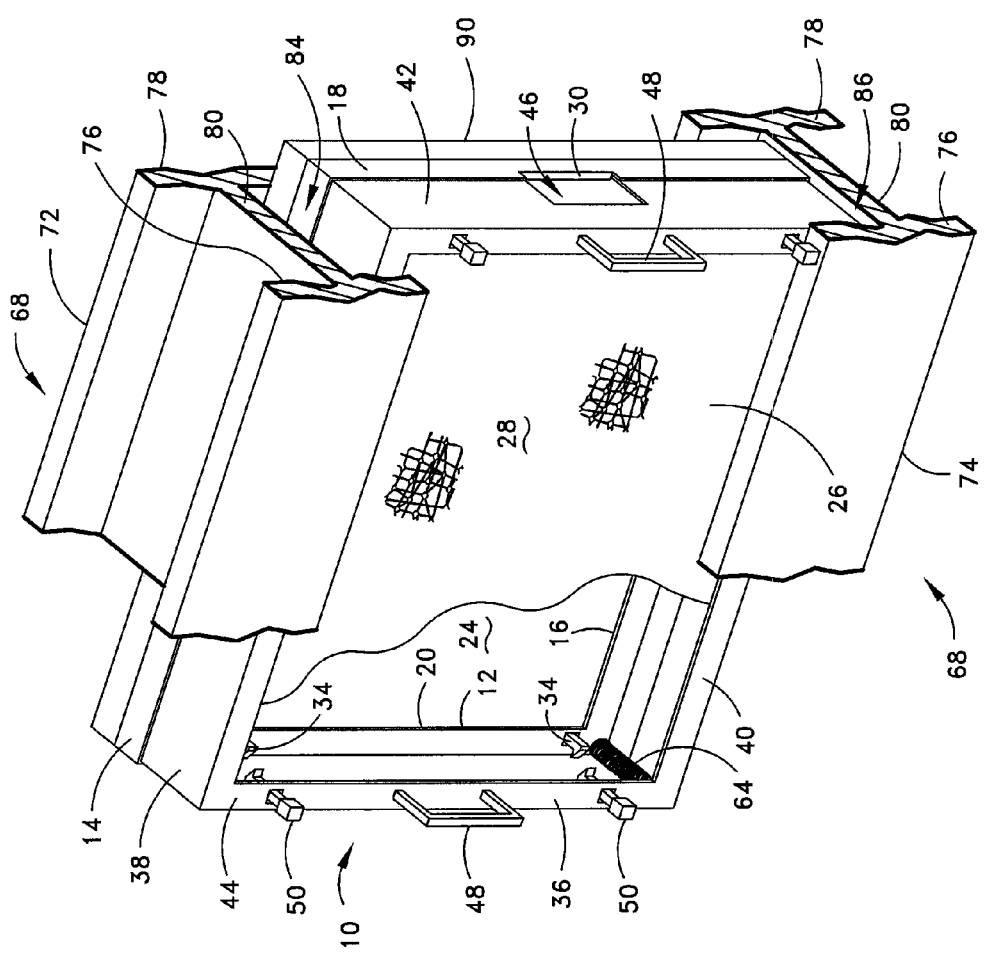
FIG. 6 is a view similar to the view of FIG. 4, but with the spring loaded filter clamping frame of FIG. 1 in an expanded state.

Turning to FIG. 6, when the spring loaded filter clamping frame 10 is in its intended position, each of the front latch mechanisms 50 are actuated to release the front latch mechanisms 50 from the rear latch mechanisms 34. This action allows the coil springs to move the front frame section 36 away from the rear frame section 12, expanding the spring loaded filter clamping frame 10. The expansion continues until the bottom front portion 40, right front portion 42, and left front portion 44 of the front frame section 36 contact the upstream member 76 of the bottom section space 86 and the bottom rear portion 16, right rear portion 18, and left rear portion 20 contact the final filter 90. This expansion expands the spring loaded filter clamping frame 10 to a position somewhat short of its fully expanded state, and the coil springs remain able to exert force on the final filter 90 and the upstream member 76.

Figure 7:
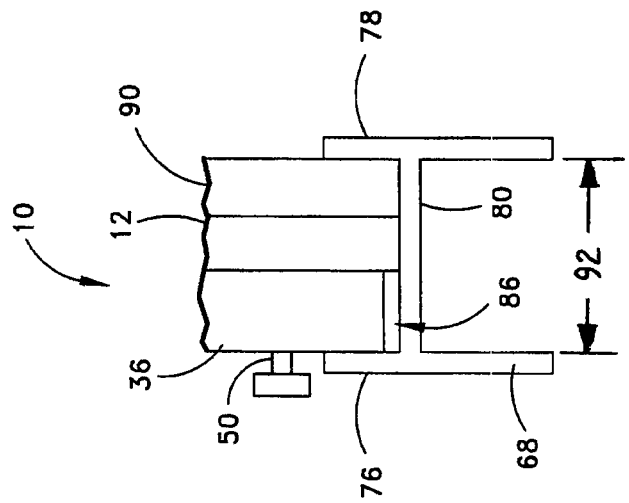
FIG. 7 is a view similar to the view of FIG. 5, but with the spring loaded filter clamping frame of FIG. 1 in an expanded state.

Turning to FIG. 7, in its partially expanded state, the spring loaded filter clamping frame 10 applies force to both the upstream member 76 of the bottom section 74 and the final filter 90. The final filter 90 is held in place by this force, and is sandwiched between the spring loaded filter clamping frame 10 and the downstream member 78 of the bottom section 74. The compression force exerted by the coil springs in the spring loaded filter clamping frame 10 help hold the final filter 90 in place and reduce undesired movement of the final filter 90 during filtration equipment operation. Additionally, the force of the coil springs aids in compressing any gasket material that is associated with the final filter 90. Proper operation of the final filter 90 gasket helps ensure that the entire fluid flow is moving through the final filter 90 instead of around the final filter 90 to allow particulate matter to reach downstream mechanical equipment.

In order to remove the spring loaded filter clamping frame 10 from the filtration equipment, the front frame section 36 is pushed into the rear frame section 12, compacting the coil springs. When the front frame section 36 has reached a certain distance, the front latch mechanisms 50 engage the rear latch mechanisms 34 to hold the spring loaded filter clamping frame 10 in its collapsed state as shown in FIG. 4. The spring loaded filter clamping frame 10 is then lifted vertically until the front bottom portion clears the upstream wall of the bottom section. The spring loaded filter clamping frame 10 can then be rotated about the top front portion 38 so that the spring loaded filter clamping frame 10 can then be moved downward and removed from the up and under filter holding frame 68 of the filtration equipment.

Use of the spring loaded filter clamping frame 10 can enable the use of high efficiency filters in existing filtration equipment without costly retrofits to the filtration equipment. This can improve the efficiency of the filtration equipment in addition to improving the required time and required effort of replacing standard filters with high efficiency filters on older filtration equipment, such as the filtration equipment associated with a gas turbine.

It is to be appreciated that the spring loaded filter clamping frame 10 is sized and configured in correspondence with the size and configuration of the filtration equipment. As such, the dimensions, such as length and width may be varied. It is further contemplated that an example of the filter element 26 contained within the spring loaded filter clamping frame 10 may have a varied surface area, dependent upon the design of the filtration equipment and fluid flow cleanliness requirements. It is also to be appreciated that the spring loaded filter clamping frame 10 may also be operated with multiple filter elements 26 or without a filter element 26 to simply reduce any undesired movement in the final filter 90 and compress the final filter 90 gasket material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A spring loaded filter clamping frame including:
   a rear frame section defining an interior space, the rear frame section securing a filter element, the rear frame section including:
   a projection attached to the rear frame section extending toward the interior space;
   a rear latch mechanism;
   a front frame section defining an interior space, wherein the front frame section is slidably engageable with the rear frame section, the front frame section securing the filter element, the front frame section including:
   an aperture to interact with the projection;
   a front latch mechanism to interact with the rear latch mechanism; and
   a frame biasing member located between the rear frame section and the front frame section within the interior space defined by each frame section, wherein the frame biasing member applies a force urging the rear frame section and the front frame section apart, resulting in a spring loaded filter clamping frame.

2. The spring loaded filter clamping frame according to claim 1, wherein the frame biasing member is a coil spring, a first end of the frame biasing member contacting the rear frame section and an opposing second end of the frame biasing member contacting the front frame section.

3. The spring loaded filter clamping frame according to claim 1, wherein the rear latch mechanism is a fixed hook.

4. The spring loaded filter clamping frame according to claim 1, wherein the front latch mechanism is a hook, rotatably attached to the front frame section and urged to a neutral position by the latch mechanism biasing member.

5. The spring loaded filer clamping frame according to claim 1, wherein the rear frame section has an L-shaped cross-section.

6. The spring loaded filter clamping frame according to claim 1, wherein the front frame section has an L-shaped cross-section.

7. The spring loaded filter clamping frame according to claim 1, wherein the projection is a lip.

8. The spring loaded filter clamping frame according to claim 1, further including at least one handle attached to the front frame.

9. A filter including:
   a rear frame section defining an interior space, the rear frame section securing a filter element, the rear frame section including:
   a projection attached to the rear frame section extending toward the interior space;
   a rear latch mechanism;
   the filter element including filter media;
   a front frame section defining an interior space, wherein the front frame section is slidably engageable with the rear frame section, the front frame section securing the filter element, the front frame section including:
   an aperture to interact with the projection;
   a front latch mechanism to interact with the rear latch mechanism; and
   a frame biasing member located between the rear frame section and the front frame section within the interior space defined by each frame section, wherein the frame biasing member applies a force urging the rear frame section and the front frame section apart, resulting in a spring loaded filter clamping frame.

10. The filter according to claim 9, wherein the frame biasing member is a coil spring.

11. The filter according to claim 9, wherein the rear latch mechanism is a fixed hook.

12. The filter according to claim 9, wherein the front latch mechanism is a hook, rotatably attached to the front frame section and urged to a neutral position by the latch mechanism biasing member.

13. The filter according to claim 9, wherein the rear frame section has an L-shaped cross-section.

14. The filter according to claim 9, wherein the front frame section has an L-shaped cross-section.

15. The filter according to claim 9, wherein the projection is a lip.

16. The filter according to claim 9, further including at least one handle attached to the front frame.

17. A filtration media apparatus inlet for a gas turbine including:
   A rear frame section defining an interior space, the rear frame section securing a filter element, the rear frame section including:
   a projection attached to the rear frame section extending toward the interior space;
   a rear latch mechanism;
   a front frame section defining an interior space, wherein the front frame section is slidably engageable with the rear frame section, the front frame section securing the filter element, the front frame section including:
   an aperture to interact with the projection;
   a front latch mechanism to interact with the rear latch mechanism; and
   a frame biasing member located between the rear frame section and the front frame section within the interior space defined by each section, wherein the frame biasing member applies a force urging the rear frame section and the front frame section apart, resulting in a spring loaded filter clamping frame.

* * * * *